US011801899B2

(12) United States Patent
Runius et al.

(10) Patent No.: US 11,801,899 B2
(45) Date of Patent: Oct. 31, 2023

(54) SYSTEM FOR A VEHICLE ROOF

(71) Applicant: Volvo Car Corporation, Gothenburg (SE)

(72) Inventors: Hakan Runius, Gothenburg (SE); Malin Aronsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/826,912

(22) Filed: May 27, 2022

(65) Prior Publication Data

US 2022/0379968 A1 Dec. 1, 2022

(30) Foreign Application Priority Data

Jun. 1, 2021 (CN) .......................... 202121208310.4

(51) Int. Cl.
*B62D 25/02* (2006.01)
*B62D 27/02* (2006.01)
*B62D 25/06* (2006.01)
*B62D 65/06* (2006.01)

(52) U.S. Cl.
CPC ............. *B62D 25/06* (2013.01); *B62D 25/02* (2013.01); *B62D 27/023* (2013.01); *B62D 65/06* (2013.01)

(58) Field of Classification Search
CPC ........ B62D 25/02; B62D 25/06; B62D 25/07; B62D 27/023; B62D 65/06; B60J 7/22

USPC ...... 296/216.06–216.9, 203.01, 203.03, 210, 296/215
See application file for complete search history.

(56) References Cited

U.S. PATENT DOCUMENTS

| | | | | |
|---|---|---|---|---|
| 4,883,310 A | * | 11/1989 | Miyazaki | ............... B62D 25/06 296/210 |
| 7,077,462 B1 | * | 7/2006 | De Gaillard | ........... B62D 25/06 296/210 |
| 7,922,239 B2 | * | 4/2011 | Mathes | .................. B62D 25/06 296/210 |

* cited by examiner

*Primary Examiner* — Dennis H Pedder
(74) *Attorney, Agent, or Firm* — Clements Bernard Walker; Christopher L. Bernard

(57) ABSTRACT

A system for a vehicle roof, the system includes a roof structure defining a roof opening and a functional type roof assembly, the functional type roof assembly including a functional type panel and an intermediate frame supporting the functional type panel, the intermediate frame having an outer peripheral edge configured to be mounted to the roof structure such that the roof opening is watertightly sealed by the functional type roof assembly, the outer peripheral edge of the intermediate frame having contour features consistent with those of an outer peripheral edge of a standard type panel, the outer peripheral edge of the standard type panel being configured to be mounted to the roof structure when the roof opening is watertightly sealed by the standard type panel in place of the functional type roof assembly.

16 Claims, 6 Drawing Sheets

SYSTEM FOR A VEHICLE ROOF

CROSS-REFERENCE TO RELATED APPLICATION

The present disclosure claims the benefit of priority of Chinese Patent Application No. 202121208310.4, filed on Jun. 1, 2021, and entitled "SYSTEM FOR A VEHICLE ROOF," the contents of which are incorporated in full by reference herein.

TECHNICAL FIELD

The present disclosure relates to the field of vehicle manufacturing and more particularly to a system for a vehicle roof.

BACKGROUND

Nowadays, different types of roof panels can be designed and provided for the same model of vehicle, i.e., for the same vehicle body. However, different and complex vehicle assembly processes are incorporated to assemble the different types of roof panels to the same vehicle body, thus affecting operation procedures for manufacturing the same model of vehicle in various shops, such as weld stations, paint shops, and final assembly shops.

Specifically, the vehicle body includes a roof structure configured to support a roof panel. When a standard type panel is mounted to the roof structure, a sealing member is applied to the roof structure so as to be disposed between the roof structure and the standard type panel, and then the standard type panel is welded to the roof structure, thus ensuring a waterproof function of a vehicle roof. Alternatively, when a functional type panel such as a glass panel, a solar panel or a plastic panel is mounted to the roof structure, a glue string is additionally applied to the sealing member so as to be disposed between the sealing member and the functional type panel such that the functional type panel can be glued to the roof structure. Therefore, the sealing member applied to the roof structure must be brushed manually to be flush especially at four corner transition areas of the roof structure so as to create a surface suitable for placing the glue string and the functional type panel during a final assembly process. This requires manual work, thus reducing a production efficiency and increasing a production cost of the vehicle roof.

SUMMARY

The present disclosure is directed to provide a system for a vehicle roof that can simplify and unify operation procedures for manufacturing the same model of vehicle with different types of roof panels in various shops.

In one aspect of the present disclosure, there is provided a system for a vehicle roof, the system including a roof structure defining a roof opening and a functional type roof assembly, the functional type roof assembly including a functional type panel and an intermediate frame supporting the functional type panel, the intermediate frame having an outer peripheral edge configured to be mounted to the roof structure such that the roof opening is watertightly sealed by the functional type roof assembly, the outer peripheral edge of the intermediate frame having contour features consistent with those of an outer peripheral edge of a standard type panel, the outer peripheral edge of the standard type panel being configured to be mounted to the roof structure when the roof opening is watertightly sealed by the standard type panel in place of the functional type roof assembly.

Optionally, a sealing member is disposed between the outer peripheral edge of the intermediate frame and the roof structure, the sealing member being configured to be disposed between the outer peripheral edge of the standard type panel and the roof structure when the roof opening is watertightly sealed by the standard type panel in place of the functional type roof assembly.

Optionally, the outer peripheral edge of the intermediate frame is welded to the roof structure by a first plurality of spot welds formed on the roof structure at the same positions where a second plurality of welding points are to be formed on the roof structure to weld the outer peripheral edge of the standard type panel to the roof structure when the roof opening is to be watertightly sealed by the standard type panel in place of the functional type roof assembly.

Optionally, roof moldings are disposed on two side portions of the outer peripheral edge of the intermediate frame that extend parallel to a longitudinal direction of the vehicle roof so as to cover the first plurality of welding points, the roof moldings being configured to be disposed on two side portions of the outer peripheral edge of the standard type panel that extend parallel to the longitudinal direction of the vehicle roof so as to cover the second plurality of welding points when the roof opening is watertightly sealed by the standard type panel in place of the functional type roof assembly.

Optionally, the functional type panel is configured as a glass panel, a solar panel or a plastic panel.

Optionally, the intermediate frame includes an intermediate section extending inwards from the outer peripheral edge of the intermediate frame, forming a first downward step structure.

Optionally, the intermediate section defines an intermediate opening, and a glue string is applied along the intermediate section such that the functional type panel is glued onto the intermediate section to watertightly seal the intermediate opening.

Optionally, the intermediate frame includes an inner peripheral edge extending inwards from the intermediate section, forming a second downward step structure, the inner peripheral edge being configured as an unloaded and free end so as to increase the stiffness of the intermediate frame.

Optionally, roof rails for assisting in carrying items on the vehicle roof are disposed on two side portions of the outer peripheral edge of the intermediate frame that extend parallel to a longitudinal direction of the vehicle roof, the roof rails being configured to be disposed on two side portions of the outer peripheral edge of the standard type panel that extend parallel to the longitudinal direction of the vehicle roof when the roof opening is watertightly sealed by the standard type panel in place of the functional type roof assembly.

Optionally, the contour features include at least one of a curvature, a shape, and a size.

Optionally, the intermediate frame and the standard type panel are both formed of a steel plate by stamping.

The system provided by the present disclosure includes the functional type roof assembly with the intermediate frame, wherein the contour features (e.g., the curvature, the shape, and the size) of the outer peripheral edge of the intermediate frame are consistent with those of the outer peripheral edge of the standard type panel such that almost the same operation procedures are required in the various shops for manufacturing the same model of vehicle with the standard type panel or alternatively with the functional type roof assembly. Moreover, the intermediate frame itself includes a plurality of sections separated from each other as seen in a cross-section of the intermediate frame, e.g., the inner peripheral edge for increasing structural stiffness, the intermediate section for supporting the functional type panel, and the outer peripheral edge for welding to the roof structure, such that the plurality of sections are independent of each other and do not affect each other, facilitating an overall configuration of the system.

Further features of the present disclosure and advantages thereof are provided in the following detailed description of exemplary embodiments according to the present disclosure with reference to the attached drawings.

BRIEF DESCRIPTION OF THE DRAWINGS

The attached drawings, which are incorporated in and constitute a part of the specification, illustrate the embodiments of the present disclosure and, together with the description thereof, serve to explain the principles of the present disclosure.

DETAILED DESCRIPTION

Figure 1:
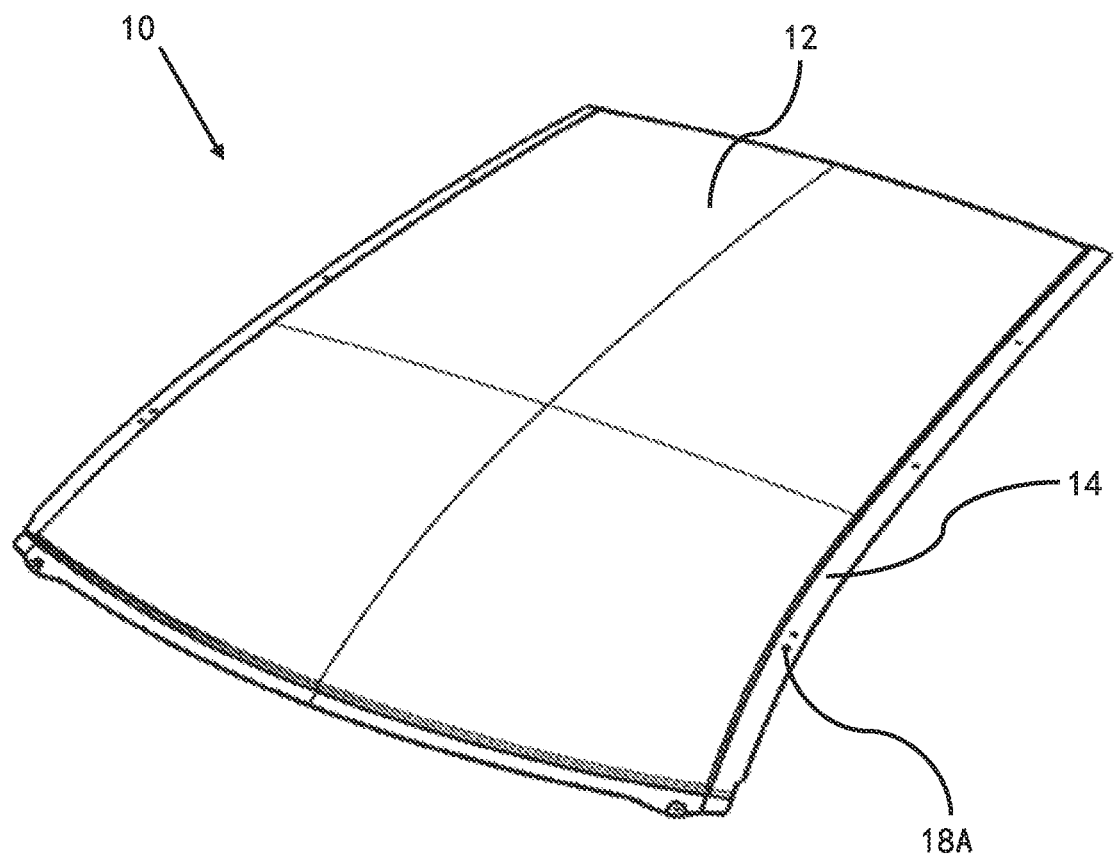
FIG. 1 is a perspective view of a standard type panel configured to be mounted to a roof structure of a system for a vehicle roof according to an embodiment of the present disclosure.

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

Techniques, methods and apparatus as known by one of ordinary skill in the relevant art may not be discussed in detail but are intended to be part of the specification where appropriate.

The following description of one or more exemplary embodiments is merely illustrative in nature and is not intended to limit the present disclosure, its application, or uses. Therefore, other exemplary embodiments may have different values, structures, or features.

It should be noted that the same reference numerals and letters refer to the same items in the subsequent figures, and thus once an item is defined in one figure, it may not be further discussed for the subsequent figures.

As used herein, the terms "inner" and "inwards" refer to a direction towards a center of a vehicle roof, the terms "outer" and "outwards" refer to a direction away from the center of the vehicle roof, the term "downwards" refers to a direction towards a vehicle chassis or a ground, and the term "upwards" refers to a direction away from the vehicle chassis or the ground.

Different types of roof panels can be designed for the same model of vehicle so as to provide a consumer with a variety of choices. As used herein, the same model of vehicle refers to a vehicle having the same vehicle body, especially the same body in white, with the same roof structure. One of the different types of roof panels can be chosen by the consumer before or after it is mounted to the roof structure in a vehicle manufacturer.

Such a roof structure is included in a system for a vehicle roof according to an embodiment of the present disclosure. Generally, a roof opening enclosed in a circumferential direction of the vehicle roof is defined by the roof structure. For instance, the roof structure can include two side parts extending in a longitudinal direction of the vehicle roof, a front part connecting a leading end of one of the two side parts to a leading end of the other of the two side parts, and a rear part connecting a trailing end of the one of the two side parts to a trailing end of the other of the two side parts. Thus, the two side parts, the front part, and the rear part can be integrated or assembled to form a support interface for supporting the one of the different types of roof panels, the support interface being designed to have certain contour features, i.e., a certain curvature, a certain shape, a certain size and the like, with respect to the longitudinal direction and/or a transverse direction of the vehicle roof so as to form an overall appearance or structure of the vehicle roof.

Figure 2:
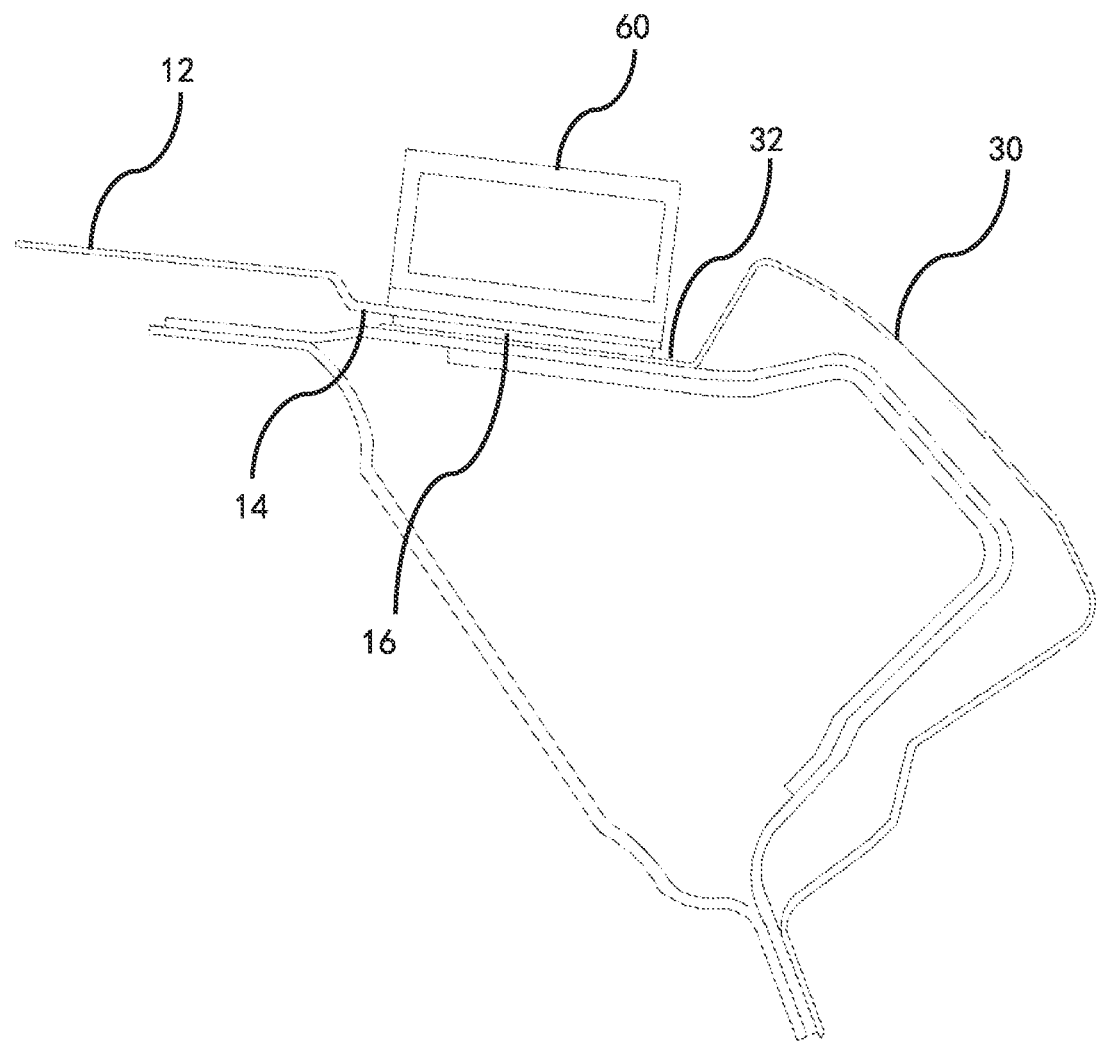
FIG. 2 is a cross-sectional view of the standard type panel of FIG. 1 and the roof structure to which the standard type panel is mounted.

Referring to FIGS. 1 and 2, a standard type panel 10 is configured as an ordinary roof shell substantially formed of a plate of steel or other metal materials and having no additional functions. Generally, the standard type panel 10 can be formed by stamping, such that the standard type panel 10 includes a main body 12 conforming to the vehicle body as a whole and an outer peripheral edge 14 that is bent downwards and then extends outwards relative to the main body 12. The outer peripheral edge 14 of the standard type panel 10 has contour features matched to those of the support interface 32 of the roof structure 30 such that the standard type panel 10 can cover the roof opening entirely when mounted to the roof structure 30. A sealing member 16, e.g., an elastomer, can be applied between the support interface 32 of the roof structure 30 and the outer peripheral edge 14 of the standard type panel 10 to ensure that the roof opening is watertightly sealed by the standard type panel 10, as shown in FIG. 2 schematically and not to scale. That is, first, the sealing member 16 is applied substantially uniformly on the support interface 32 formed by the side parts, the front part, and the rear part of the roof structure 30. It is noted that the sealing member 16, when applied on corner transition areas between the side parts and the front part or between the side parts and the rear part, tends to form a concavo-convex shape, i.e., portions of the sealing member 16 applied on the corner transition areas are not flat relative to other portions of the sealing member 16 applied on the rest of the support interface 32. Then, the outer peripheral edge 14 of the standard type panel 10 is welded to the roof structure 30 in a weld station, where the outer peripheral edge 14 of the standard type panel 10 is aligned and matched to the support interface 32 of the roof structure 30 and a plurality of spot welds 18A is formed therebetween. When the standard type panel 10 is welded to the roof structure 30, the sealing member 16 is tightly pressed against the outer peripheral edge 14 of the standard type panel 10, thus not affecting the formation of the plurality of spot welds 18A and contributing to a waterproof function of the vehicle roof.

Figure 3:
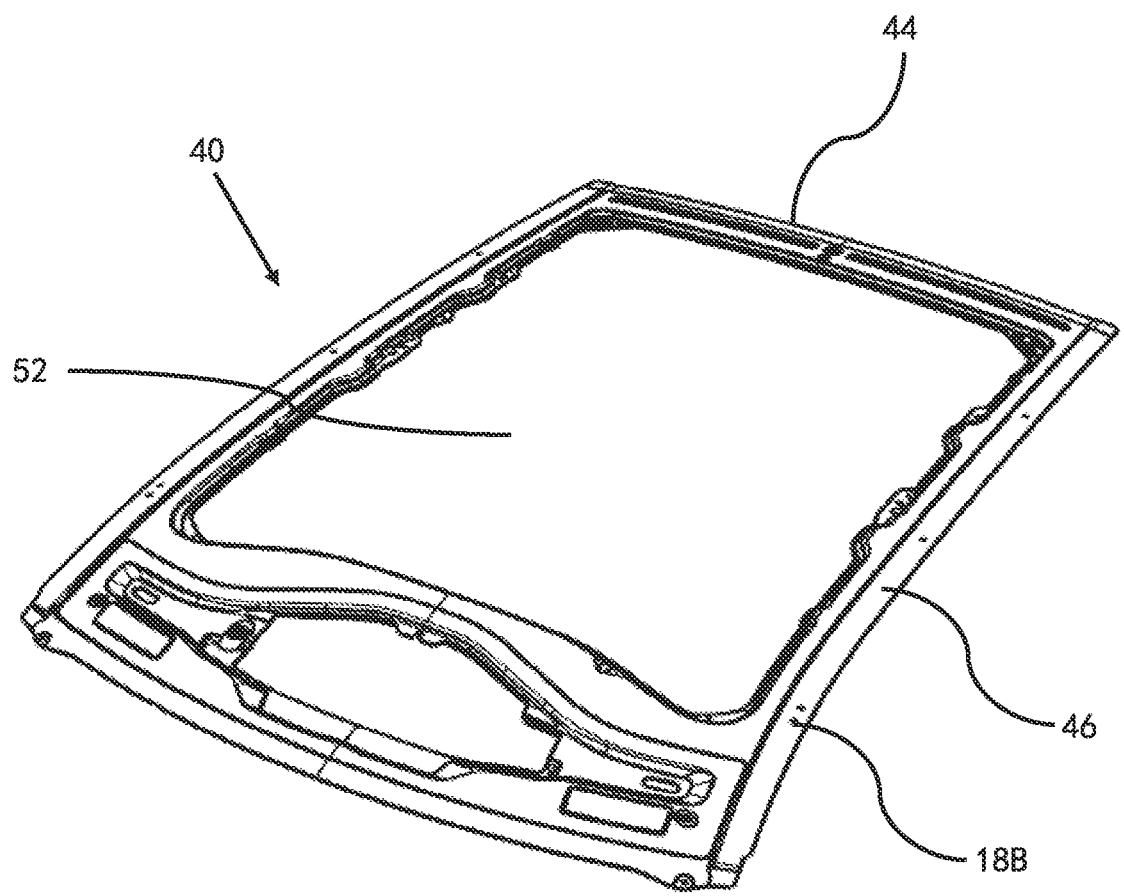
FIG. 3 is a perspective view of a functional type roof assembly of a system for a vehicle roof according to an embodiment of the present disclosure.
Figure 4:
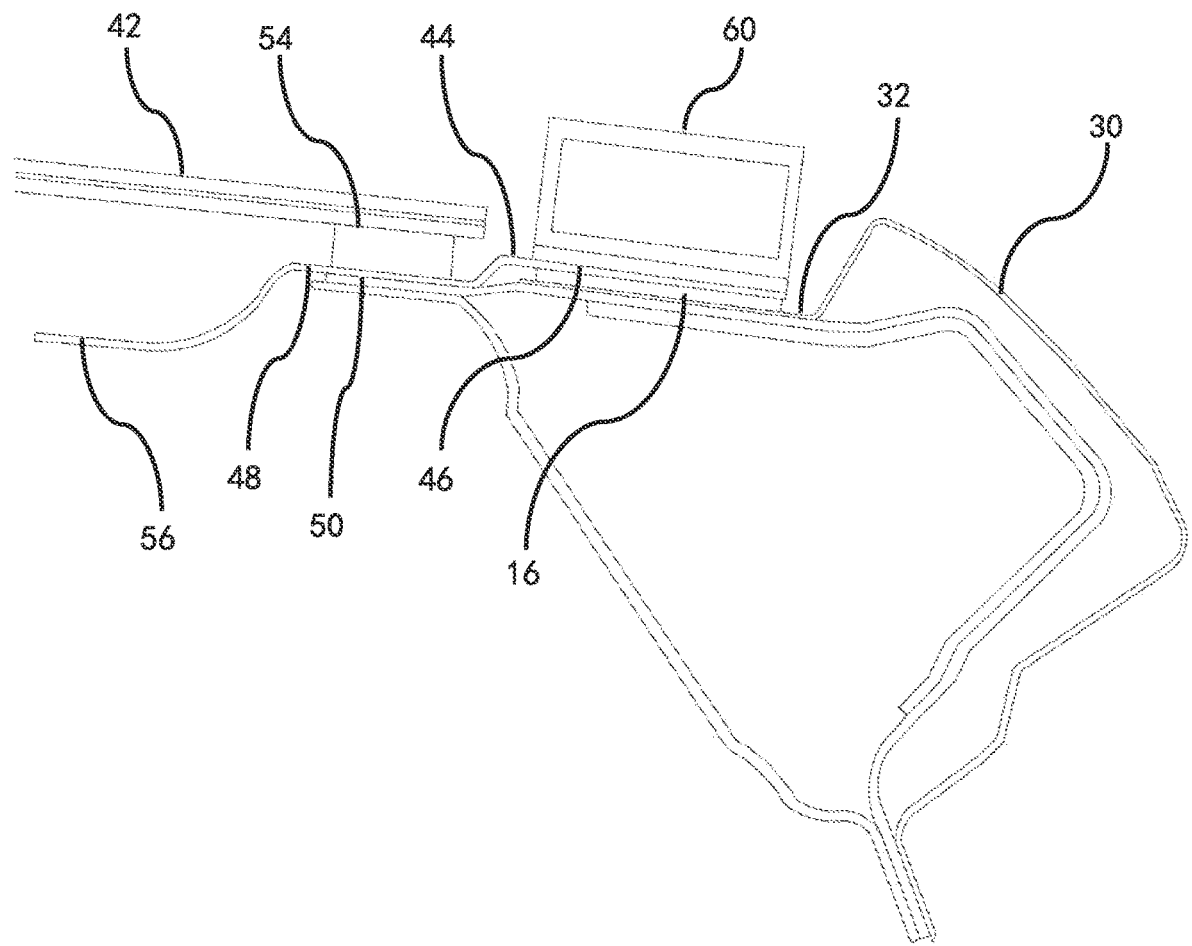
FIG. 4 is a cross-sectional view of the functional type roof assembly of FIG. 3 and a roof structure of the system to which the functional type roof assembly is mounted.

Referring to FIGS. 3 and 4, the system includes a functional type roof assembly 40. The consumer is free to choose the functional type roof assembly 40 in place of the standard type panel 10 for the same model of vehicle. The functional type roof assembly 40 includes a functional type panel 42 and an intermediate frame 44 supporting the functional type panel 42 with its outer peripheral edge 46. Thus, the intermediate frame 44 defines an intermediate opening 52 covered and preferably watertightly sealed by the functional type panel 42. The outer peripheral edge 46 of the intermediate frame 44 is configured to be mounted to the support interface 32 of the roof structure 30 such that the roof opening is watertightly sealed by the functional type roof assembly 40. The outer peripheral edge 46 of the intermediate frame 44 has contour features consistent with those of the outer peripheral edge 14 of the standard type panel 10 so as to simplify and unify operation procedures for manufacturing the same model of vehicle with the standard type panel 10 or alternatively with the functional type roof assembly 40 in various shops. Therefore, similar to mounting the standard type panel 10 to the roof structure 30, the sealing member 16, e.g., the elastomer, can be applied between the support interface 32 of the roof structure 30 and the outer peripheral edges 46 of the intermediate frame 44 when the functional type roof assembly 40 is mounted to the roof structure 30, as shown in FIG. 4 schematically and not to scale. Then, the outer peripheral edge 46 of the intermediate frame 44 is welded to the roof structure 30 in the weld station, where the outer peripheral edge 46 of the intermediate frame 44 is aligned and matched to the support interface 32 of the roof structure 30 and a plurality of spot welds 18B is formed therebetween. When the roof opening is watertightly sealed by the standard type panel 10, the plurality of the spot welds 18A are formed on the roof structure 30 at the same positions where the plurality of spot welds 18B are to be formed on the roof structure 30 when the roof opening is watertightly sealed by the functional type roof assembly 40.

Optionally, the functional type panel 42 can be configured as a glass panel, a solar panel, or a plastic panel. The glass panel can be configured as a single-layer glass panel or a double-layer glass panel. The plastic panel can be translucent or opaque. As used herein, the functional type panel 42 is designed to be fixed relative to the roof structure 30, but can be movable relative to the roof structure 30 according to specific applications.

Especially referring to FIG. 4, different from the mounting of the standard type panel 10 to the roof structure 30, when the functional type roof assembly 40 is mounted to the vehicle roof structure 30, it is required to mount the functional type panel 42 to the intermediate frame 44 at a suitable stage. To this end, the intermediate frame 44 includes an intermediate section 48 extending inwards from the outer peripheral edge 46 of the intermediate frame 44, forming a first downward step structure. That is, the intermediate section 48 includes a first transition part extending obliquely downwards from an inner end of the outer peripheral edge 46 of the intermediate frame 44 and a generally flat engagement part 50 for supporting the functional type panel 42 and hence defining the intermediate opening 52. Optionally, a glue string 54, preferably an elastomer, is applied on the engagement part 50 of the intermediate section 48 to glue the functional type panel 42 to the engagement part 50 of the intermediate section 48 so as to watertightly seal the intermediate opening 52.

The outer peripheral edge 46 for applying the sealing member 16 is separated from the intermediate section 48 for applying the glue string 54 by the first downward step structure as seen in a cross-section of the intermediate frame 44, thus avoiding overlapping the sealing member 16 with the glue string 54, thereby reducing the difficulty of mounting the functional type panel and any adverse impact on the waterproof function and the appearance of the vehicle roof.

Optionally, the intermediate frame 44 includes an inner peripheral edge 56 extending inwards from the intermediate section 48, forming a second downward step structure. That is, the inner peripheral edge 56 includes a second transition part extending obliquely downwards from an inner end of the engagement part 50 of the intermediate section 48 and a free end 58 extending generally horizontally. The inner peripheral edge 56 of the intermediate frame 44 is unloaded and only serves to increase the stiffness of the intermediate section 48 defining the large intermediate opening 52. It can be understood that the inner peripheral edge 56 of the intermediate frame 44 can be sized according to the specific applications such that the stiffness of the intermediate frame 44 can meet requirements for different functional type panels 42.

Optionally, roof rails 60 for assisting in carrying items on the vehicle roof are disposed on two side portions of the outer peripheral edge 46 of the intermediate frame 44 that extend parallel to a longitudinal direction of the vehicle roof, that is, the two side portions of the intermediate frame 44 are sandwiched between the support interface 32 of the roof structure 30 and the roof rails 60 respectively. The same and/or common roof rails 60 are configured to be disposed on two side portions of the outer peripheral edge 14 of the standard type panel 10 that extend parallel to the longitudinal direction of the vehicle roof when the roof opening is watertightly sealed by the standard type panel 10 in place of the functional type roof assembly 40.

Figure 5:
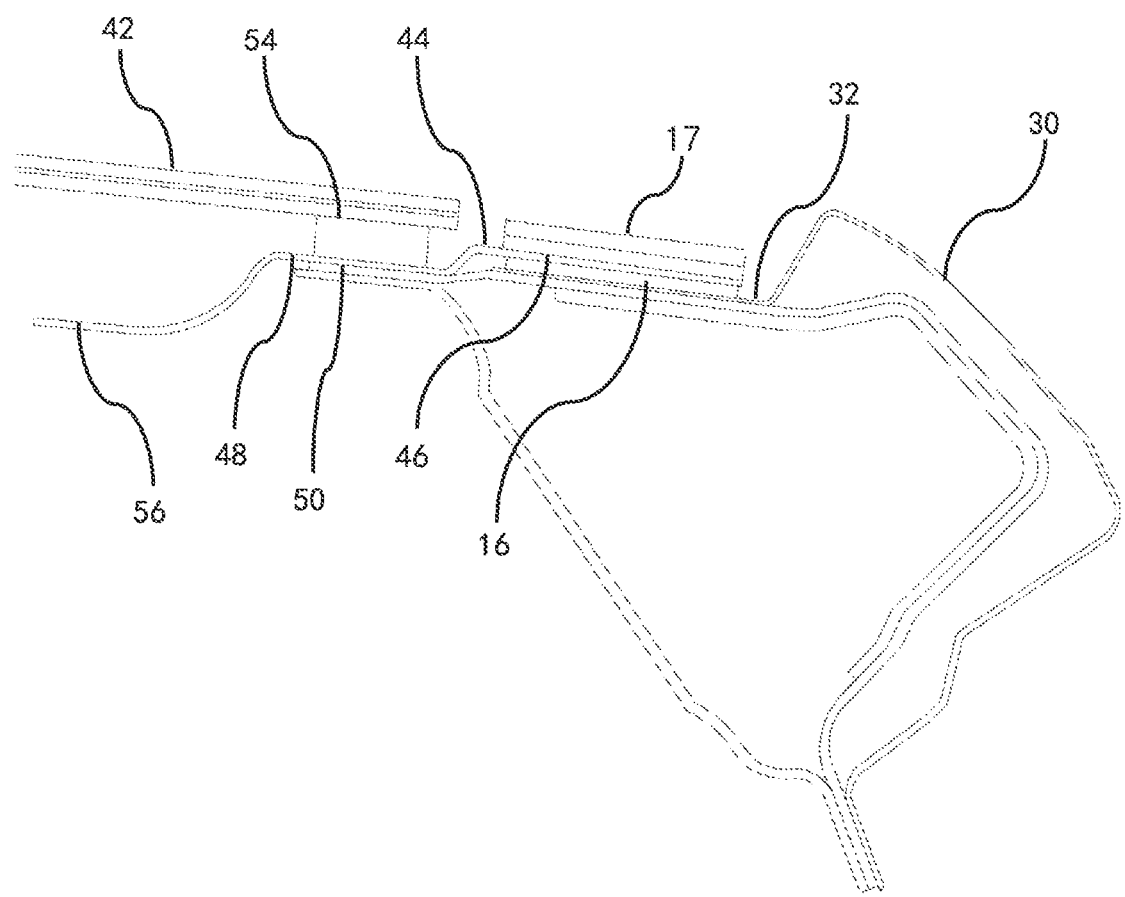
FIG. 5 is another cross-sectional view of the functional type roof assembly of FIG. 4 and the roof structure to which the functional type roof assembly is mounted.
Figure 6:
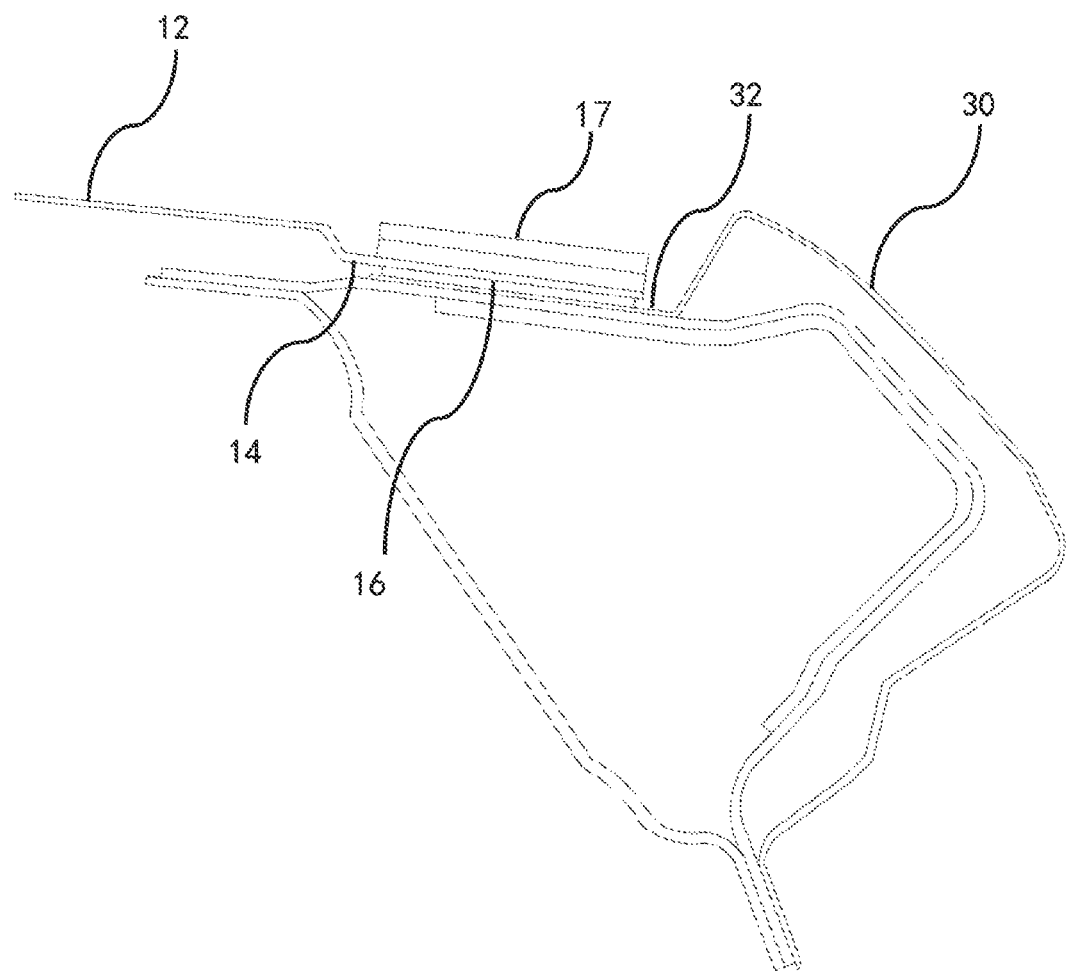
FIG. 6 is another cross-sectional view of the standard type panel of FIG. 2 and the roof structure to which the standard type panel is mounted.

Optionally, roof moldings 17 (as shown in FIG. 5) which can assist in covering screws and/or the plurality of spot welds 18B are disposed on the two side portions of the outer peripheral edge 46 of the intermediate frame 44 that extend parallel to the longitudinal direction of the vehicle roof, that is, the two side portions of the intermediate frame 44 are sandwiched between the support interface 32 of the roof structure 30 and the roof moldings 17 which are decorative and/or facilitate drainage. The same and/or common roof moldings 17 are configured to be disposed on the two side portions of the outer peripheral edge 14 of the standard type panel 10 that extend parallel to the longitudinal direction of the vehicle roof when the roof opening is watertightly sealed by the standard type panel 10 in place of the functional type roof assembly 40 such that the roof moldings 17 can assist in covering screws and/or the plurality of spot welds 18A (as shown in FIG. 6).

Thus, the intermediate frame 44 has a surface and a shape designed to be substantially compatible with those of the standard type panel 10 particularly in terms of the peripheral edge 46 of the intermediate frame 44 and the peripheral edge 14 of the standard type panel 10, in that case, the intermediate frame 44 and the standard type panel 10 as two pieces can be transported simultaneously since the same controlled fixture can be used to pick and place the two pieces, and the surfaces and the shapes of the two pieces formed by such as stamping can be measured by the same measurement procedures and measurement coordinates so as to ensure a consistent geometric outcome of the vehicle roof for the same model of vehicle. More importantly, in vehicle assembly processes, the two pieces can seal the roof opening by using the same application equipment and machine procedures in a final assembly shop, by forming spot welds at the same positions on the roof structure by the same welding equipment in the weld station, and by loading the same and/or common additional components on the outer peripheral edges of the two pieces, etc. Optionally, the intermediate frame 44 and the standard type panel 10 can both be formed of a steel plate by stamping.

Although some specific embodiments of the present disclosure have been demonstrated in detail with examples, it should be understood by those skilled in the art that the above examples are only intended to be illustrative but not to limit the scope of the present disclosure and the above embodiments could be modified without departing from the scope and spirit of the present disclosure.

The invention claimed is:

1. A system for a vehicle roof, the system comprising:
a roof structure defining a roof opening, and
a functional type roof assembly comprising:
  a functional type panel, and
  an intermediate frame supporting the functional type panel, the intermediate frame having an outer peripheral edge configured to be mounted to the roof structure such that the roof opening is watertightly sealed by the functional type roof assembly,
  wherein the intermediate frame comprises an intermediate section extending inwards from the outer peripheral edge of the intermediate frame, forming a first downward step structure,
  wherein the intermediate section defines an intermediate opening, and a glue string is applied along the intermediate section such that the functional type panel is glued onto the intermediate section to watertightly seal the intermediate opening,
  wherein the intermediate frame further comprises an inner peripheral edge extending inwards from the intermediate section, forming a second downward step structure, the inner peripheral edge being unloaded and including a free end extending horizontally so as to increase the stiffness of the intermediate frame, and
  wherein the outer peripheral edge of the intermediate frame has contour features consistent with those of an outer peripheral edge of a standard type panel.

2. The system according to claim 1, further comprising a sealing member disposed between the outer peripheral edge of the intermediate frame and the roof structure.

3. The system according to claim 2, wherein the outer peripheral edge of the intermediate frame is welded to the roof structure by a plurality of spot welds formed on the roof structure.

4. The system according to claim 3, further comprising roof moldings disposed on two side portions of the outer peripheral edge of the intermediate frame that extend parallel to a longitudinal direction of the vehicle roof so as to cover the plurality of welding points.

5. The system according to claim 1, wherein the functional type panel is configured as a glass panel, a solar panel or a plastic panel.

6. The system according to claim 1, further comprising roof rails for assisting in carrying items on the vehicle roof disposed on two side portions of the outer peripheral edge of the intermediate frame that extend parallel to a longitudinal direction of the vehicle roof.

7. The system according to claim 1, wherein the contour features comprise at least one of a curvature, a shape, and a size.

8. The system according to claim 1, wherein the intermediate frame is formed of a steel plate by stamping.

9. A vehicle comprising:
a chassis; and
a system for a vehicle roof coupled to the chassis, the system comprising:
  a roof structure defining a roof opening, and
  a functional type roof assembly comprising:
    a functional type panel, and
    an intermediate frame supporting the functional type panel, the intermediate frame having an outer peripheral edge configured to be mounted to the roof structure such that the roof opening is watertightly sealed by the functional type roof assembly,
    wherein the intermediate frame comprises an intermediate section extending inwards from the outer peripheral edge of the intermediate frame, forming a first downward step structure,
    wherein the intermediate section defines an intermediate opening, and a glue string is applied along the intermediate section such that the functional type panel is glued onto the intermediate section to watertightly seal the intermediate opening,
    wherein the intermediate frame further comprises an inner peripheral edge extending inwards from the intermediate section, forming a second downward step structure, the inner peripheral edge being unloaded and including a free end extending horizontally so as to increase the stiffness of the intermediate frame, and
    wherein the outer peripheral edge of the intermediate frame has contour features consistent with those of an outer peripheral edge of a standard type panel.

10. The vehicle according to claim 9, further comprising a sealing member disposed between the outer peripheral edge of the intermediate frame and the roof structure.

11. The vehicle according to claim 10, wherein the outer peripheral edge of the intermediate frame is welded to the roof structure by a plurality of spot welds formed on the roof structure.

12. The vehicle according to claim 11, further comprising roof moldings disposed on two side portions of the outer peripheral edge of the intermediate frame that extend parallel to a longitudinal direction of the vehicle roof so as to cover the plurality of welding points.

13. The vehicle according to claim 9, wherein the functional type panel is configured as a glass panel, a solar panel or a plastic panel.

14. The vehicle according to claim 9, further comprising roof rails for assisting in carrying items on the vehicle roof disposed on two side portions of the outer peripheral edge of the intermediate frame that extend parallel to a longitudinal direction of the vehicle roof.

15. The vehicle according to claim 9, wherein the contour features comprise at least one of a curvature, a shape, and a size.

16. The vehicle according to claim 9, wherein the intermediate frame is formed of a steel plate by stamping.

* * * * *